(12) United States Patent
Waffenschmidt

(10) Patent No.: US 6,338,598 B1
(45) Date of Patent: Jan. 15, 2002

(54) CONVEYING SYSTEM FOR RIGIDLY INTERCONNECTED PARTS

(75) Inventor: Heinrich Waffenschmidt, Stein (DE)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/546,875

(22) Filed: Apr. 10, 2000

(30) Foreign Application Priority Data

Apr. 13, 1999 (DE) .......................... 199 16 589

(51) Int. Cl.[7] ................................ B65G 53/34
(52) U.S. Cl. ...................... 406/194; 406/85; 406/88; 226/97.1; 226/97.4
(58) Field of Search .......................... 406/85, 88, 191, 406/194; 226/97.4, 97.1

(56) References Cited

U.S. PATENT DOCUMENTS

| | | | | | |
|---|---|---|---|---|---|
| 5,004,172 | A | * | 4/1991 | Tanahashi et al. | ........ 242/54 R |
| 5,299,890 | A | * | 4/1994 | Spatafora et al. | ............. 406/88 |
| 5,388,704 | A | * | 2/1995 | Morris | .................... 209/139.1 |
| 5,788,425 | A | * | 8/1998 | Skow et al. | .................. 406/88 |

\* cited by examiner

*Primary Examiner*—Christopher P. Ellis
*Assistant Examiner*—Joe Dillon, Jr.
(74) *Attorney, Agent, or Firm*—Perman & Green, LLP

(57) ABSTRACT

This invention relates to a conveying system (1) for rigidly interconnected parts (2), particularly on a machine tool for the further processing of semi-product parts, comprising a conveying duct (3) with at least one compressed air supply line (4*a*–4*c*) with an air flow component in the conveying direction.

12 Claims, 1 Drawing Sheet

CONVEYING SYSTEM FOR RIGIDLY INTERCONNECTED PARTS

Figure 1:
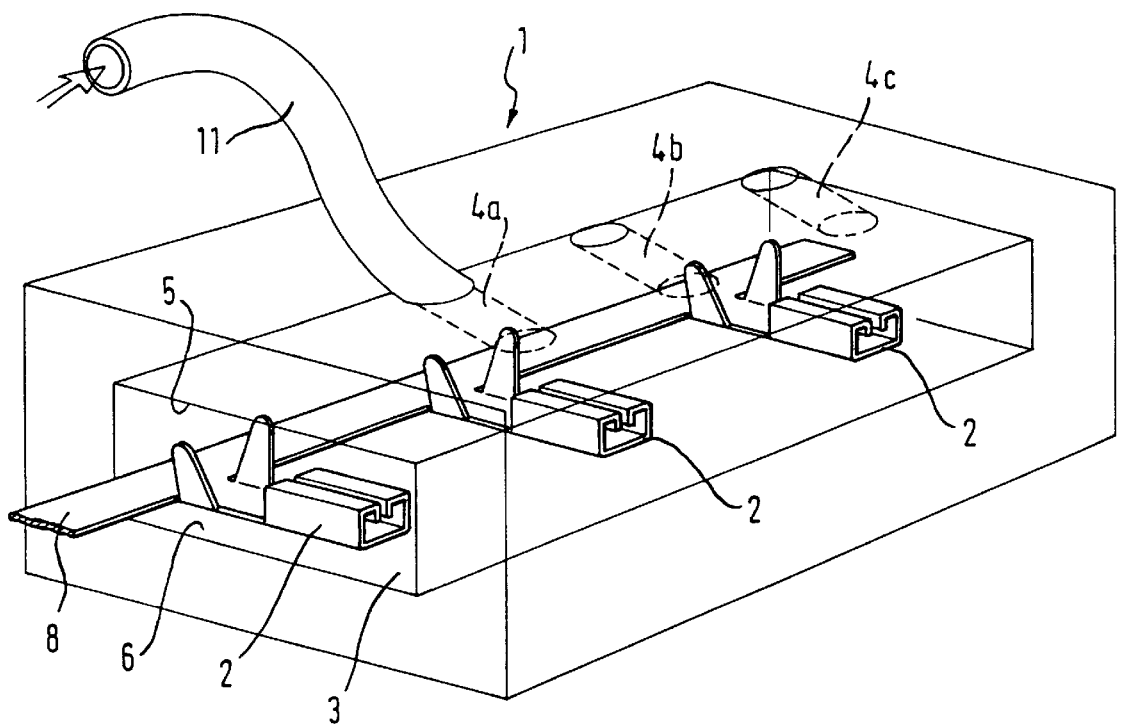

This invention relates to a conveying system for rigidly interconnected parts in accordance with the preamble of claim 1. The conveying system according to the invention is used particularly in assembly machines for the further processing of semi-product parts. The term rigidly interconnected semi-product parts in this connection denotes parts stamped from a metal strip for further processing as plug pins or sockets. The plug socket parts which have not yet been completed are interconnected by a metal strip which is left between them and which fixes them definitely in respect of their relative position. In the case of plug sockets there are constructions in which the plug-in zone is reinforced by a retaining spring. A retaining spring of this kind is an additional part which is fitted to the as yet uncompleted plug socket in an assembly machine intended for the purpose. For this purpose, the machine is supplied with a strip of plug sockets, the retaining springs being applied to the individual plug sockets at a very high cycle frequency. In these conditions accurate positioning of the plug sockets interconnected by the metal strip is very important so that the retaining spring can be correctly assembled. To this end, holes are stamped in the metal strip and conical centring pins are introduced therein in a conventional conveying system, the pins are moved in the conveying direction with a specific step width, the retaining springs are fitted to the plug sockets and then the conical pins are withdrawn to engage in the next hole situated further back, in order to advance the strip with the plug sockets one step. The movement of the conical pin for the stepwise introduction of the plug sockets into the machine tool is a multi-stage relatively complex process, which limits the maximum cycle frequency of the plug socket processing operation. Also, this conveying system is relatively complicated, maintenance-intensive and trouble-prone due to the number of moving parts which also comprise retaining means which hold the metal strip fast while the conical pins are withdrawn.

The object of this invention is so to improve a conveying system according to the preamble that a higher working cycle frequency can be obtained with simpler means with, at the same time, reduced maintenance outlay and reduced liability to defects.

This problem is solved in accordance with the claim. The sub-claims indicate features of preferred embodiments of the invention.

The idea underlying the present invention is that reliable continuous pressing of the parts, which are rigidly interconnected via a metal strip, against a stop, will ensure adequately accurate positioning of the semi-product parts in an assembly machine so that complicated retention by means of conical pins engaging in holes stamped in the metal strip can be dispensed with. Instead it is sufficient to ensure conveyance of the semi-products interconnected by the metal strip by means of a suitably selected air flow in the conveying direction.

Figure 2:
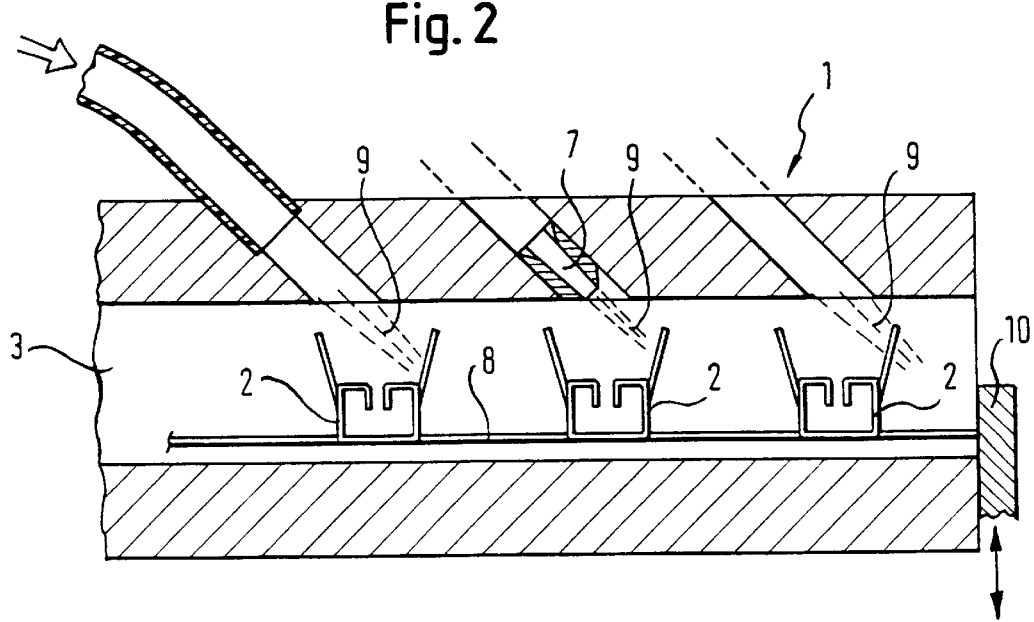

The invention is explained in detail below with reference to one exemplified embodiment and the accompanying drawings wherein:

FIG. 1 is a perspective diagrammatic view of the conveying system according to the invention and FIG. 2 is a longitudinal section along the conveying direction through the conveying system according to the invention as shown in FIG. 1.

FIG. 1 shows the conveyor system according to the invention in a highly diagrammatic form, i.e., certain structural outline conditions for the use on a machine tool are disregarded here. The conveyor system 1 consists of a housing in which a conveyor duct 3 is formed, through which semi-product parts 2, which are interconnected on a strip 8, are conveyed, the semiproduct parts in this case being plug sockets, at the end face of which a retaining spring is to be fixed. Bores inclined obliquely in the direction of conveying lead into the top zone 5 of the conveying duct 3 and serve as compressed air supply lines 4a–4c. The latter are connected to a compressed air source (not shown) via hoses. The inclination of the compressed air supply lines, their cross-section, and the pressure with which the air is forced through these supply lines are so adjusted as to give uniform conveying with the avoidance of vibrations of the metal strip and the semi-product parts fixed thereon. The cross-section of the conveying duct 3 is also selected in accordance with the pressure, the parts being conveyed through the duct 3 with minimal clearance in the vertical and lateral direction. As shown in FIG. 2, nozzles can be provided in the compressed air supply lines in order to focus the compressed air jet. The emerging compressed air jet 9 can also be directed on to the individual parts 2 and/or on to the strip 8 connecting said parts 2. In the latter case it is advantageous if the strip is roughened so as to offer resistance to the air flow so as to produce a conveying effect. If a plurality of compressed air supply lines are provided as shown in the drawings, it is advantageous if the distance between the orifices of the compressed air supply lines in the conveying duct 3 is not equal to the distance between the parts 2, since otherwise, with the feed forces involved, interference effects may occur which might obstruct uniform feed of the strip with the parts 2. It is important that the strip should abut a stop 12, which is shown only diagrammatically, without any vibration during the assembly of a retaining spring on the plug socket 2. For this purpose, advantageously, the compressed air jet is pulsed in order to produce constant conditions at the time of assembly. To save compressed air, pulsation can provide a contribution for the return movement, and the same applies to the selection of optimal geometry of the conveying duct 3 and of the arrangement of the compressed air supply lines 4a–4c, so that it is possible to drop from a pressure of 6 bar to pressures up to 2 bar, this giving a considerable saving of compressed air.

The conveying system according to the invention has no movable parts whatsoever which might be subject to wear or mis-adjustment, so that compared with conventional conveying systems the possibility of breakdown and wear is greatly reduced. The conveying system according to the invention can also be produced much more cost-effectively because of its simple structure.

The above description of one exemplified embodiment of the invention has no limiting force. On the contrary, the invention covers all possible variants coming under the text of the claims.

What is claimed is:

1. On an assembly machine, a conveying system (1) that conveys rigidly interconnected parts (2), said machine for the further processing of said parts into semi-product parts, characterised by a conveying duct (3) having at least one compressed air supply line (4a–4c) with an air flow component in the conveying direction.

2. A conveying system according to claim 1, characterised in that the conveying duct (3) is so dimensioned that the interconnected parts (2) for conveying pass through the duct with minimal lateral and vertical clearance.

3. A conveying system according to claim 1, characterised in that a compressed air supply lines (4a–4c) are disposed in the base (6) and/or top zone (5).

4. A conveying system according to claim 1 for stampings (2) interconnected by a metal strip (8), characterised in that at least one compressed air jet is directed on to the metal strip (8).

5. A conveying system according to claim 1, characterised in that the compressed air jet (9) is pulsed.

6. A conveying system according to claim 1, characterised in that the compressed air jet (9) flows with a constant throughput.

7. A conveying system according to claim 1, characterised in that the interconnected parts (2) are pressed by the air flow (9) against a stop substantially (10) without vibration until a further processing step has been carried out.

8. A conveying system according to claim 1, characterised in that the compressed air (9) is introduced at a pressure between 2 and 6 bar.

9. A conveying system according to claim 1, characterised in that the compressed air supply lines (4a–4c) are bores inclined obliquely in said conveys direction.

10. A conveying system according to claim 9, characterised in that nozzles (7) are disposed on the bore side facing the interior of a conveying duct (4a–4c).

11. A conveying system according to claim 1 for stampings (2) interconnected by a metal strip (8), characterised in that at least one compressed air jet (9) is directed on the stampings (2).

12. A conveying system according to claim 11, characterised in that a plurality of compressed air supply lines (4a–4c) are disposed in the conveying duct (3) with spacing in the conveying direction, such spacing not being equal to the distance between adjacent stampings (2).

* * * * *